March 29, 1927.
J. P. SEAHOLM
1,622,740
SEAT GUIDE CULTIVATOR
Filed May 22, 1924
7 Sheets-Sheet 1
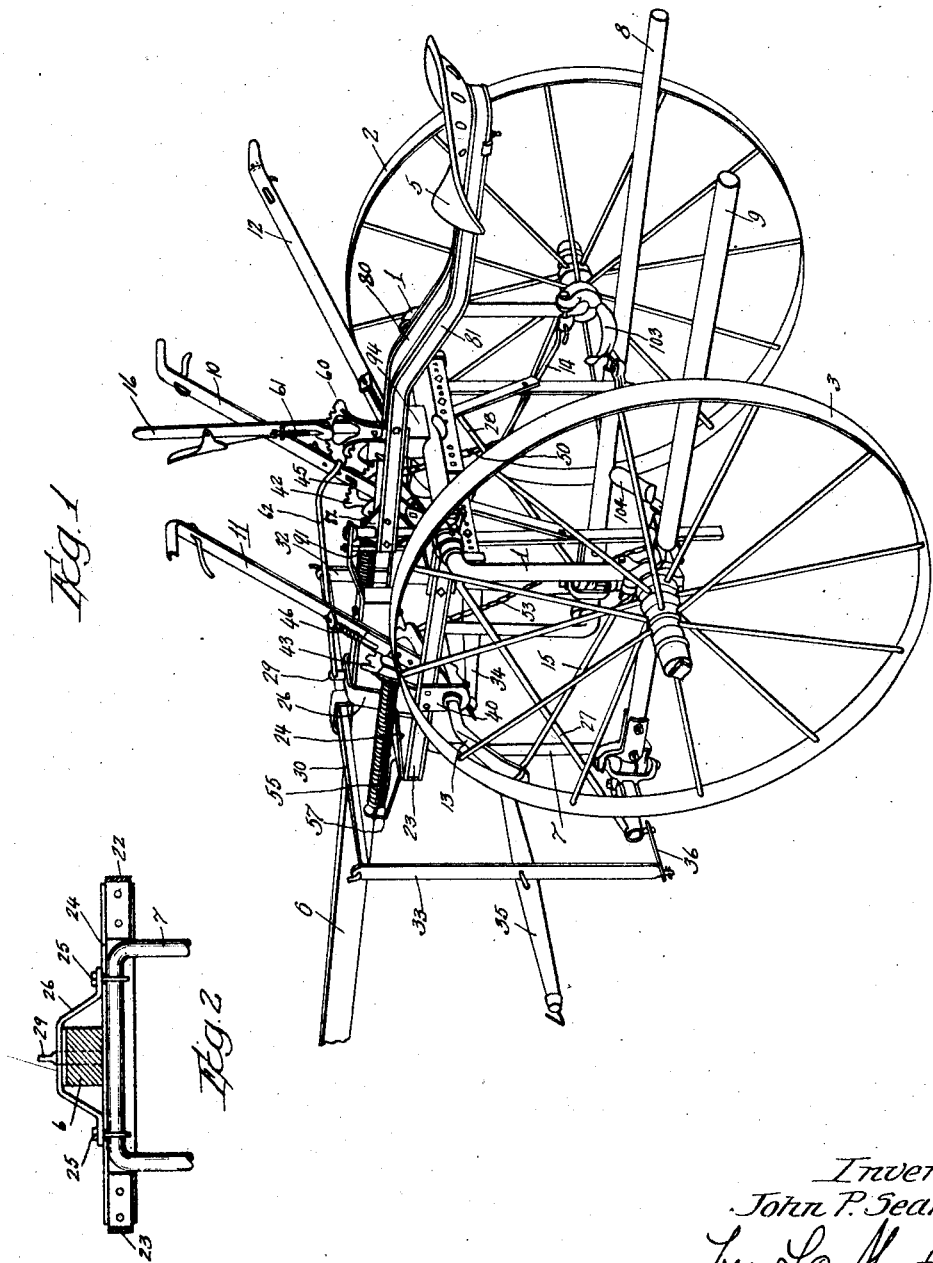
Inventor:
John P. Seaholm
by L. C. Shonts Atty.

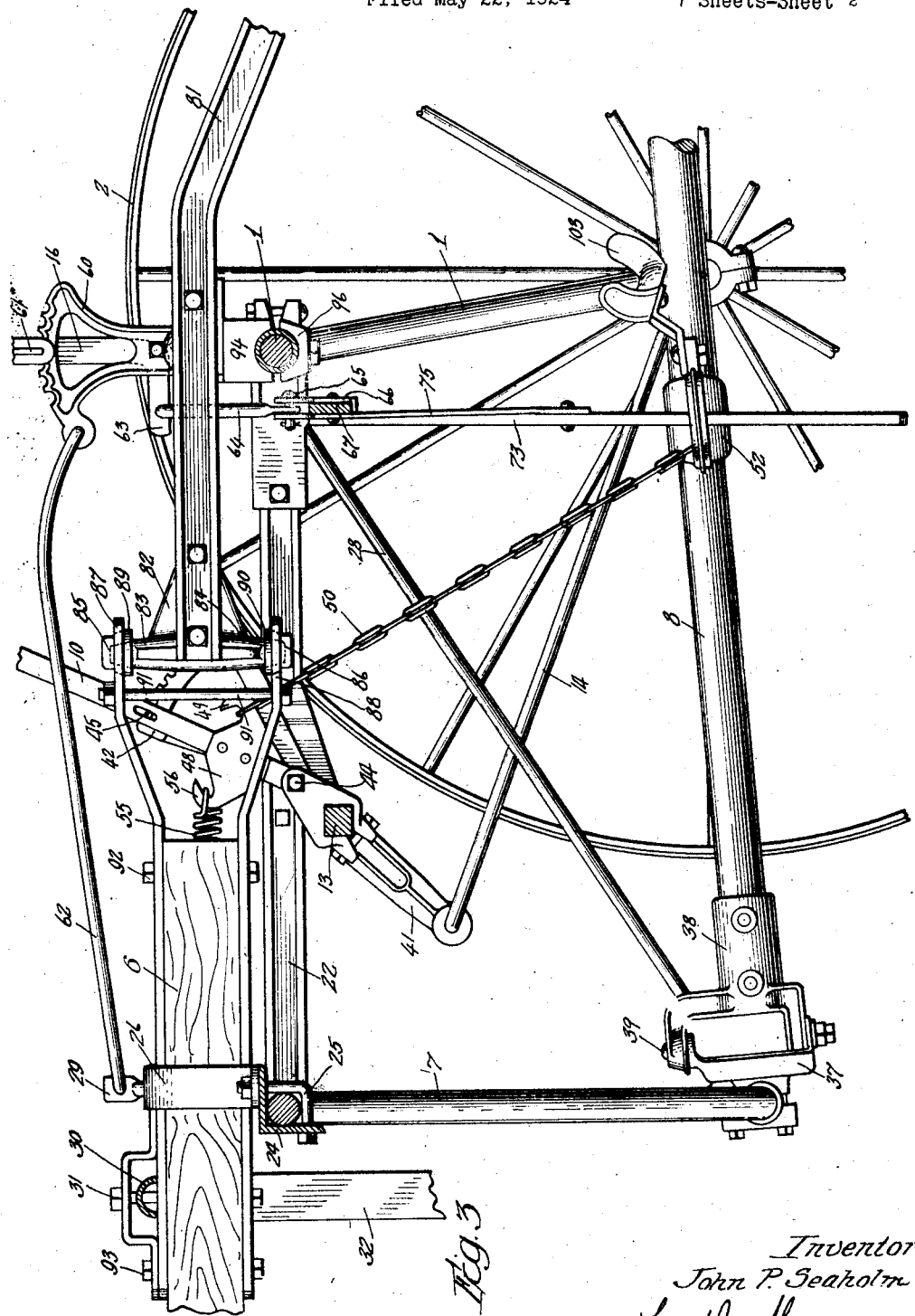

March 29, 1927.

J. P. SEAHOLM 1,622,740

SEAT GUIDE CULTIVATOR

Filed May 22, 1924      7 Sheets-Sheet 3

Fig 4

Inventor:
John P. Seaholm
by J.C. Shonts Atty.

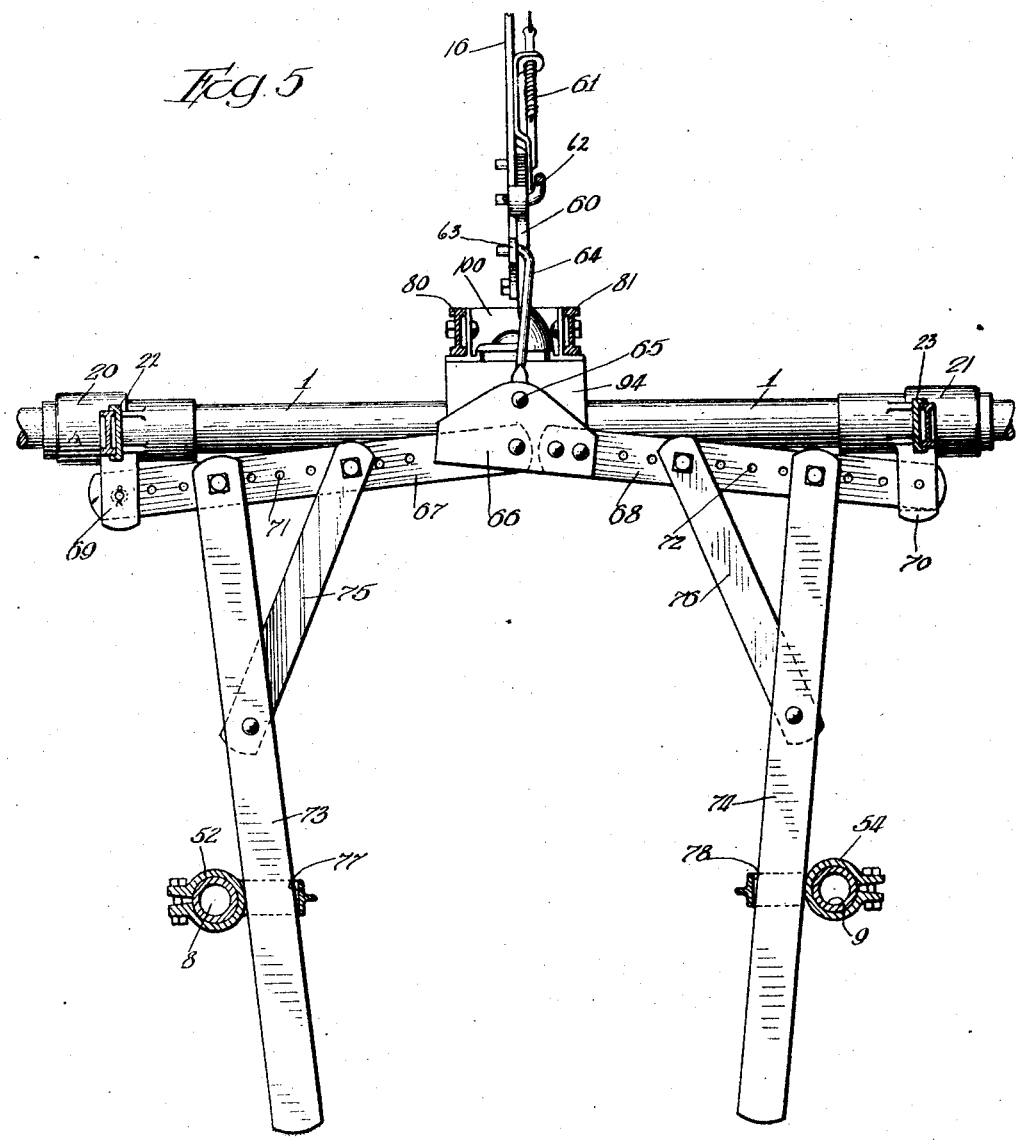

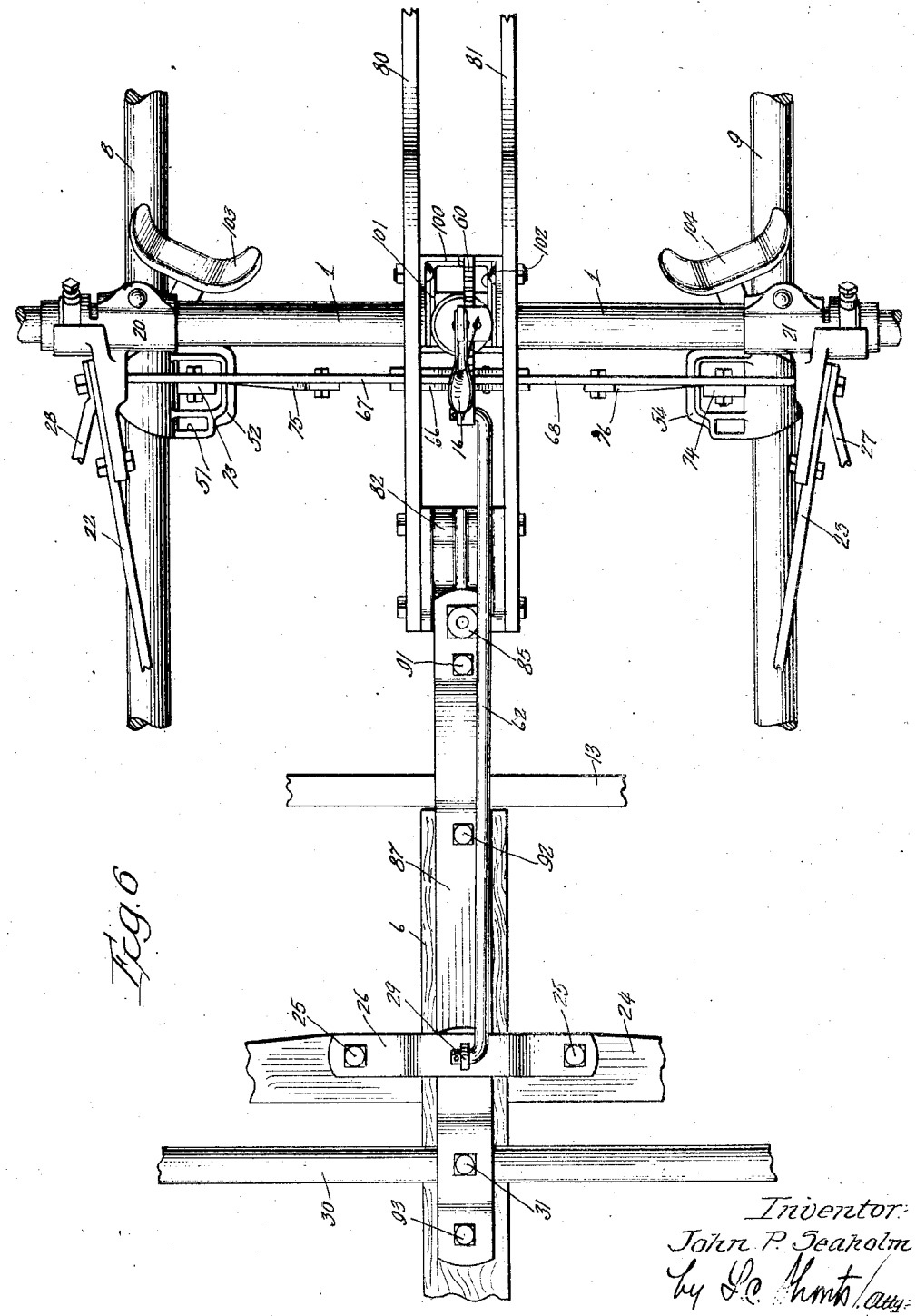

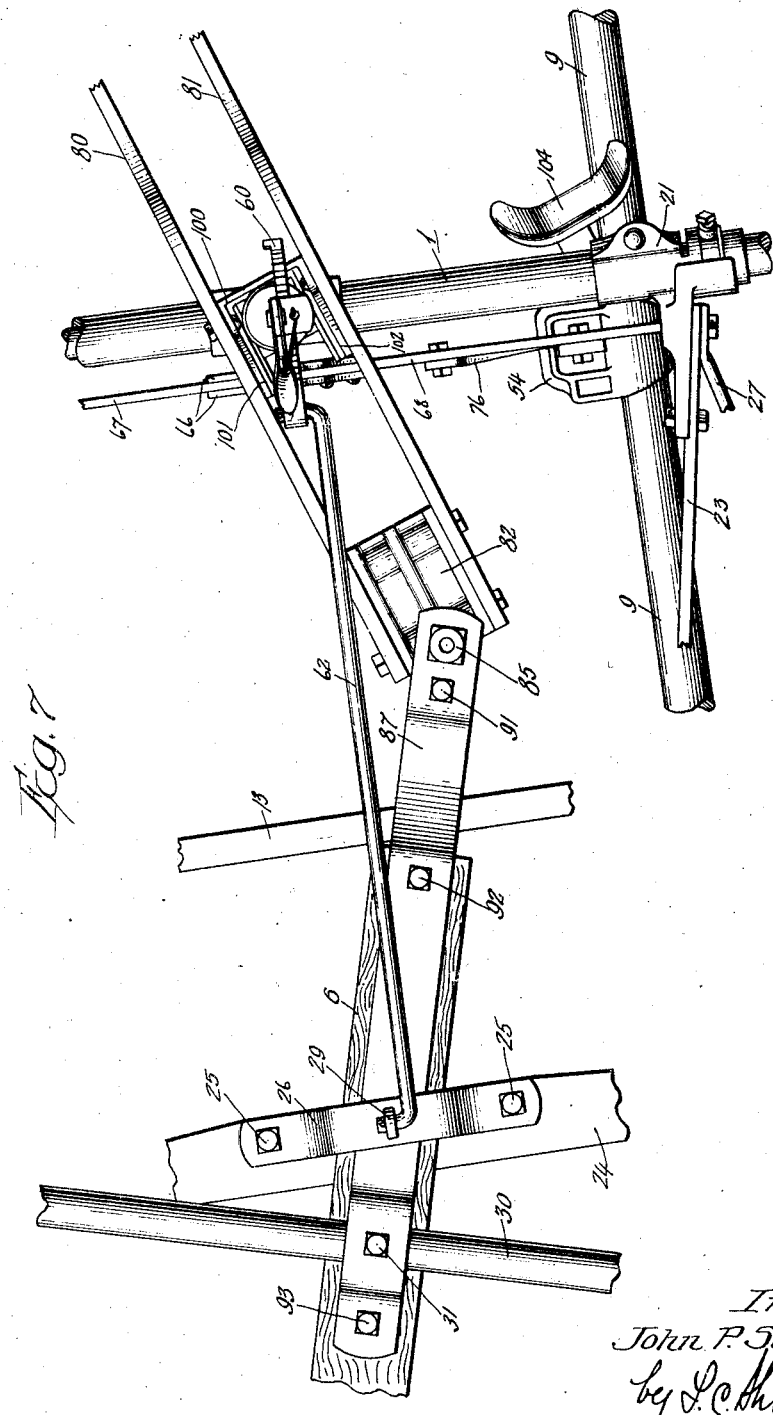

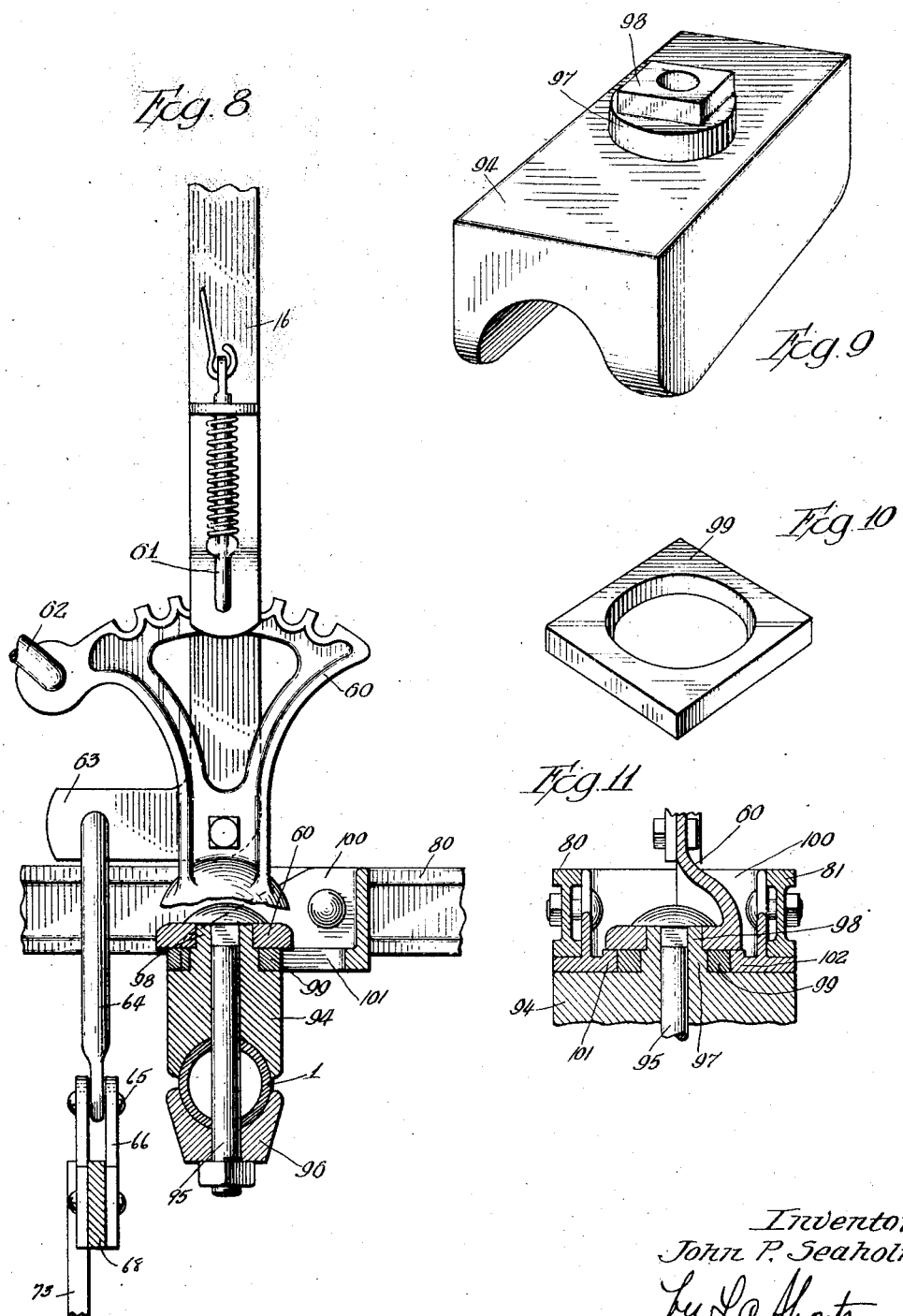

Patented Mar. 29, 1927.

1,622,740

UNITED STATES PATENT OFFICE.

JOHN P. SEAHOLM, OF MOLINE, ILLINOIS, ASSIGNOR, BY MESNE ASSIGNMENTS, TO MOLINE IMPLEMENT COMPANY, A CORPORATION OF ILLINOIS.

SEAT-GUIDE CULTIVATOR.

Application filed May 22, 1924. Serial No. 715,123.

The invention relates to a cultivator.

It relates particularly to a cultivator of the seat guide type used for cultivating corn, cotton and the like.

The general object of the invention is to provide an improved seat guide cultivator.

A more particular object is to provide an improved pivotal connection between the seat and the guiding pole of a seat guide cultivator.

A further object is to provide an improved pivotal mounting for the seat of a seat guide cultivator.

A further object is to provide an improved means for varying the distance between the drag bars of a cultivator.

A still further object is to provide an improved method of mounting the drag bar supporting arch of a cultivator.

Other objects and advantages of the invention will appear from the specification and drawings.

An embodiment of the invention is shown in the drawings in which—

Figure 1 is a perspective view of the cultivator.

Figure 2 is an elevation and partial cross-section showing the arch mounting of the cultivator.

Figure 3 is a side elevation and partial section of the cultivator.

Figure 4 is a front elevation and section showing the drag bar spacing means as viewed from the front of the cultivator.

Figure 5 is a view similar to Figure 4 with the drag bar spacing means in a different position.

Figure 6 is a plan view of a portion of the cultivator showing the position of the parts when the cultivator is moving straight ahead.

Figure 7 is a plan view similar to Figure 6 showing the position of the parts when the seat has been swung to one side to change the direction of the cultivator.

Figure 8 is a cross section illustrating the pivotal mounting of the seat bar.

Figure 9 is a perspective view of a part of the bearing of the seat mounting.

Figure 10 is a perspective view of a washer used in the seat bar pivot.

Figure 11 is a cross section of the bearing taken at right angles to the view of Figure 8.

The cultivator comprises, in general, an arched axle 1 on which are journalled the ground wheels 2 and 3. An operator's seat 5 is pivotally mounted on the arched axle 1 and pivotally connected to a guiding pole or tongue 6, both pivots being on substantially vertical axes. An arch 7 is supported at the front end of the cultivator and to this arch are pivotally connected two drag bars 8 and 9 which carry the usual cultivating devices. Each drag bar is raised and lowered independently by means of adjusting levers 10 and 11 and the two drag bars are raised together by means of a master lever 12. The master lever 12 is fixed to a transverse shaft 13 that is connected by the links 14 and 15 to the arched axle 1 so that, when the master lever is used to raise the drag bars, the arched axle is swung backward to balance the cultivator. The distance between the drag bars 8 and 9 may be varied by a drag bar spacing means which will be later described in more detail and which is controlled by the lever 16.

The arched axle is journalled in bearings 20 and 21 to which the side members 22 and 23 of the frame are connected. These frame members extend forwardly and their forward ends are bent inwardly and fastened to a cross member 24 formed of angle iron. The bent ends of the side members are of such length that the distance between their ends is just equal to the width of the arch 7 so that, when the arch is positioned on the cross member or support 24, it is automatically spaced or located transversely in its proper position by the inner ends of the two side members 22 and 23. The arch 7 is held in position on the support 24 by angle bolts 25 illustrated in Figures 2 and 3. These bolts also fasten the U-shaped bracket 26 to the cross brace 24 as illustrated in Figure 2. The angle bolts 25 are received within slots in the member 24 which prevent them from moving longitudinally of the brace and which position them properly. Bracing rods 27 and 28 extend from the bearings on the arched axle to the front arch to hold the lower end of the arch 7 in position and to brace the frame.

The guiding pole 6 is pivoted on a pin 29 which extends through the U-shaped bracket 26 and the cross member 24. The guiding pole supports a doubletree 30 pivoted on the axis 31, and depending from its ends are the pendulum members 32 and 33 carrying the swingletrees 34 and 35. The pendulum members 32 and 33 are connected to the arch by means of links, only one of which, 36, is illustrated.

The connections of the drag bars to the arch 7 are similar, one of them being illustrated in Figure 3. The connection comprises a member 37 pivoted to the arch 7 and a second member 38 pivoted to the first on a vertical axis 39. The drag bar is connected to member 38. This permits the drag bar to be moved in both a horizontal and a vertical plane.

The cultivator is balanced by the master lever 12 which oscillates the shaft 13. The shaft 13 is journalled in bearings 40 carried by the cultivator frame. Attached to the shaft are arms 41 to which the links 14 and 15 are connected. The links 14 and 15 are connected at their opposite ends to the wheel bearings on the arched axle 1. When the lever 12 is moved, the shaft 13 is oscillated and the arched axle is shifted backward and forward to vary the position of the cultivator wheels to balance the cultivator.

The individual adjustments for each drag bar are controlled by the levers 10 and 11. The shaft 13 carries two toothed segments 42 and 43 which are fixed rigidly to the shaft. The levers 10 and 11 are pivoted at the points 44 adjacent the bottom of the sectors and carry latches 45 and 46 arranged to co-operate with the teeth of their respective sectors. Each of these levers carries a hooked plate, both of which are similar and one of which, 48, is clearly illustrated in Figure 3. Connected to one of the hooked ends 49 of this plate is a chain 50 which is connected at its other end in an opening 51 in the bracket 52 on the drag bar 8. A similar chain 53 connects the plate of the lever 11 to the bracket 54 on the drag bar 9. A spring 55 is connected at one end to the other hooked portion 56 of plate 48, the other end of the spring being connected to a bracket carried by the cross member 23. One of these brackets 57 is illustrated on the left hand side of the cultivator in Figure 1. The springs serve to bias the levers 10 and 11 forwardly and they assist in raising the drag bars.

It will be clear that each of the levers 10 and 11 may be operated independently to raise and lower its respective drag bar. When the master lever 12 is operated to oscillate the shaft 13, the shaft carries the segments 42 and 43 with it and since the levers 10 and 11 are locked to the segments, these levers are moved and both the drag bars are raised and lowered with the master lever.

The distance between the drag bars may be varied by means of the lever 16. This lever operates over a tooth segment 60 mounted on the arched axle 1. It carries a latch 61 co-operating with the teeth of the segment. The segment is braced in position by means of a link 62 extending forwardly and connected to the pivot pin 29, illustrated in Figure 3. The lower end of the lever 16 has an angular extension 63 to which is pivoted a link 64 which, in turn, is pivoted at the point 65 to plates 66. Links 67 and 68 are pivoted to the opposite sides of these plates and the other ends of said links are pivoted to downwardly extending projections 69 and 70 on the bearings 20 and 21. The links 67 and 68 are provided with a series of holes 71 and 72 respectively to receive the connecting bolts of downwardly extending members 73 and 74. These members are braced against pivotal movement relative to links 67 and 68 by braces 75 and 76. The series of holes 71 and 72 provide means for normally spacing the members 73 and 74 at different distances apart. The members 73 and 74 extend loosely through openings 77 and 78 in the members 52 and 54, respectively, which are carried by the drag bars 8 and 9. The openings 77 and 78 are sufficiently large to permit the drag bars to be moved up and down without interference from the members 73 and 74.

When the drag bars occupy their normal position, the spacing mechanism occupies the position illustrated in Figure 4. When the operator desires to bring the drag bars closer together, he pulls backwardly on the lever 16 which moves the toggle links upwardly from the position of Figure 4 to that of Figure 5. This swings the drag bars closer together. If he desires to move the drag bars farther apart he moves the lever 16 in the opposite direction.

The drag bar spacing means not only serves to vary the distance between the drag bars but it also serves to prevent the drag bars from moving laterally relative to the cultivator frame. It is desirable in a cultivator of this type to have the drag bars held against lateral movement relative to the frame so that they cannot move laterally except as the cultivator is guided by movements of the operator's seat.

The drag bars 8 and 9 are held against lateral movement by the members 73 and 74. Referring to Figure 4, it will be evident that the members 73 and 74 cannot move laterally together because the links are pivoted to the projections 69 and 70 in the frame. The members 73 and 74 cannot move relative to one another unless the lever 16 is operated to move the toggle links 67 and 68. Therefore, unless the operator moves the lever 16 the whole lever construction, together with the drag bars, is locked rigidly in position. This is true whether the parts occupy the position of Figure 4 or that of Figure 5.

Two functions are thus performed by one mechanism, that is, the same mechanism that serves to vary the distance between the drag bars also serves to hold them against lateral movement relative to the cultivator. It should also be noted that a spacing means has been provided which is located ahead of the arched axle where it is out of the way. Also a spacing means has been provided which is carried by the cultivator frame, the drag bars being movable relative to the spacing means and without interference from it.

When a cultivator is guided by the seat, the seat bars must not only pivot relative to the arched axle, but some provision must be made for a sliding connection. In some cultivators the sliding connection is made between the seat bars and the guiding pole. There are many disadvantages to such a connection, however, among which are that it frequently becomes loose so that the cultivator is not instantly responsive to movements of the seat and furthermore some bracing means must be provided to absorb the upward thrust caused by the weight of the operator. Usually, some kind of a cross bar is provided on the frame and rollers are used to take the upward thrust and still permit the seat bars to move from one side to the other. These difficulties have been avoided in the present construction by providing a tight pivotal connection between the seat bars and the guiding pole and by taking care of the sliding action by making the seat bars movable on the arched axle. No bracing means is required for the pivotal connections because of the construction that is employed.

The seat 5 is carried by a seat supporting member having two spaced arms 80 and 81 which extend forwardly over the arched axle 1, the forward ends being connected to a pivot block 82. The pivot block has two cone-shaped pivots 83 and 84 over which fit the socket members 85 and 86 having tapered openings fitting over the conical pivots and having squared portions fitting into squared openings in the spaced guiding pole straps 87 and 88. The socket members have flanges 89 and 90 forming shoulders against which the straps 87 and 88 bear and a bolt 91 extends between the two straps. By tightening the nut on the bolt 91 the two socket members 85 and 86 can be forced tightly on the cone-shaped pivots to take up any wear that may occur in the pivotal connection, or to adjust or loosen it as the case may be. The straps 87 and 88 extend forwardly on opposite sides of the guiding pole 6 and they are bolted to it at points 92 and 93.

This construction for the pivotal connection between the seat bars and the guiding pole makes it unnecessary to have a cross brace or other means to support the pivot in order to make it withstand the upward thrust due to the weight of the operator. The two widely separated pivots with the connection of the seat bar to the pivot pin between its ends cause some of the upward thrust to be transformed into a longitudinal thrust on the lower side and a longitudinal pull or stress on the upper side. The wear on the socket members 85 and 86 will thus tend to be greater on the forward side of 86 and the rear side of 85. This wear can be taken up by tightening the bolt 91. Also the sockets 85 and 86 can be taken out of the square openings in straps 87 and 88, turned ¼, ½ or ¾ of a revolution and reinserted to equalize the wear. The pivot block 82 can also be removed, turned through 180 degrees, and rebolted in place with the pivot 83 pointing downward and the pivot 84 pointing upward. These many adjustments for the pivotal connection make it an easy matter to keep the pivot tight at all times and to make the wear uniform. With the connection tight, the cultivator is instantly responsive to movements of the seat which is not the case with some types in which, after the cultivator has been in use and worn slightly, permit the seat to be moved from two to six inches before any guiding action is secured. Furthermore, the absence of cross braces, rollers, etc., to support the pivotal connection to enable it to take the vertical thrust due to the weight of the operator, simplifies the construction and decreases the friction.

The seat pivot is illustrated in detail in Figures 8 to 11, inclusive. Fixed to the arched axle 1 is a bearing block 94 which is held in position by the bolt 95 and a clamping member 96. On the upper surface of the bearing block is a circular boss 97 on top of which is a squared projection 98. Fitting over the circular boss 97 is a rectangular washer 99 illustrated in Figure 10. The seat bars 80 and 81 are bolted to a U-shaped member 100, the arms 101 and 102, of which are astride the washer 99. The bottom side of the arms of this U-shaped bracket are broadened out and bear on the top surface of the bearing block 94 as shown in Figure 11.

The toothed segment 60 fits over the squared projection 98 on the bearing block and the segment is made sufficiently wide to extend over a portion of the arms 101 and 102 of the U-shaped member 100, so that the bolt 95 serves to hold the segment 60 in position and it, in turn, holds the U-shaped member 100 on the bearing block. The head of the bolt 95 bears against the top of the squared projection 98 so that, while the parts are held in position, the U-shaped member 100 can slide back and forth.

The pivotal and sliding connection of the seat bar to the crank axle has been made unusually simple and it serves as a mounting for the sector 60 as well. The bearing surface of the U-shaped member 100 on the bearing block 94 is quite broad and the sides of the U-shaped member 100 do not bear against the round projection 97 to thereby wear slots in its side. They bear against the washer 99. The washer absorbs the friction of the sliding motion, is made relatively hard, and will not easily wear out, but, if it should wear, it can easily be replaced.

It should also be observed that the brackets 52 and 54 serve three useful purposes. They serve as a connection for the chains 50 and 53; they also act as a connecting means between the members 73 and 74 of the drag bar spacing means; and they further serve as connections for the foot rests 103 and 104.

It is to be understood that the structure shown is for purposes of illustration only, and that variations may be made in it without departing from the spirit and scope of the invention, as defined by the claims.

I claim:

1. A cultivator having a wheeled frame including an arched axle, drag bars pivoted at their forward ends to move both laterally and vertically on stationary pivots carried by the frame, a drag bar spacing means connected to said frame and to the drag bars so as to permit the latter to move freely in a vertical direction but acting to prevent them from moving laterally, and a lever mechanism mounted on the arched axle and connected to the drag bar spacing means for operating it to move the drag bars to and from one another.

2. A cultivator having a wheeled frame, drag bars pivoted at their forward ends to move both laterally and vertically on stationary pivots carried by the frame, a guiding pole, a seat supporting member pivoted to the cultivator on a substantially vertical axis and carrying an operator's seat, pivotal connections between said member and the guiding pole for causing lateral movement of the operator's seat to guide the cultivator, a drag bar spacing means connecting the frame and the drag bars for preventing the drag bars from moving laterally relative to the cultivator so that the drag bars will follow the movements of the cultivator when guided by the seat, and means for operating said spacing means to vary the distance between the drag bars.

3. A cultivator having a wheeled frame, drag bars supported thereby, a seat supporting member pivotally connected to the cultivator on a substantially vertical axis and connected to the guiding pole to steer the cultivator, a drag bar spacing means, and a lever mechanism for controlling said spacing means, said lever mechanism including a sector forming a portion of the pivotal connection of the seat member to the cultivator.

4. A cultivator having a wheeled frame, drag bars supported by said cultivator, an operator's seat having a pivotal connection to the cultivator so that it can be swung about a vertical axis to steer the cultivator, a drag bar spacing means, and a lever mechanism for controlling the spacing means, said lever mechanism also forming a portion of the pivotal connection of the operator's seat to the cultivator.

In testimony whereof, I affix my signature.

JOHN P. SEAHOLM.